US007731402B2

(12) United States Patent
Tessnow et al.

(10) Patent No.: US 7,731,402 B2
(45) Date of Patent: Jun. 8, 2010

(54) LED HEADLAMP SYSTEM

(75) Inventors: Thomas Tessnow, Weare, NH (US); Ralph Johnson, Bedford, NH (US)

(73) Assignee: OSRAM SYLVANIA Inc., Danvers, MA (US)

( * ) Notice: Subject to any disclaimer, the term of this patent is extended or adjusted under 35 U.S.C. 154(b) by 159 days.

(21) Appl. No.: 11/885,626

(22) PCT Filed: Mar. 3, 2006

(86) PCT No.: PCT/US2006/007472

§ 371 (c)(1), (2), (4) Date: Aug. 29, 2008

(87) PCT Pub. No.: WO2006/096467

PCT Pub. Date: Sep. 14, 2006

(65) Prior Publication Data

US 2009/0034278 A1 Feb. 5, 2009

Related U.S. Application Data

(60) Provisional application No. 60/658,459, filed on Mar. 4, 2005.

(51) Int. Cl.
*B60Q 1/04* (2006.01)

(52) U.S. Cl. ........................ 362/545; 362/555; 362/241; 362/247; 362/249.06

(58) Field of Classification Search ................. 362/236, 362/237, 240, 242, 249.02, 249.05, 249.01, 362/543, 544, 545, 552, 554, 268, 555
See application file for complete search history.

(56) References Cited

U.S. PATENT DOCUMENTS 4,868,718 A 9/1989 Davenport
6,520,669 B1 2/2003 Chen et al.

(Continued)

FOREIGN PATENT DOCUMENTS

DE 103 15 131 10/2004

(Continued)

OTHER PUBLICATIONS

European Search Report and Annex on corresponding European Patent Application No. 06736739.1, mailed Oct. 21, 2009.

*Primary Examiner*—Thomas M Sember
(74) *Attorney, Agent, or Firm*—William E. Meyer; Edward S. Podszus

(57) ABSTRACT

A vehicle headlamp includes a first planar array of low and high beam LED light sources; a first primary optical light guide receiving low and high beam light from the LEDs; a first secondary optical light guide receiving and focusing collimated low and high beam light from the first primary light guide as a combination of low and high beam hot spots; a second planar array of LED light sources having a low and high beam LEDs; a second primary optical light guide receiving and collimating low and high beam light from second LED light sources; a second secondary optical light guide receiving said collimated low and high beam light and spreading the light as a combination of low and high beam spread pattern; a housing to mechanically support the LED arrays, the first primary optic, the first secondary optic, the second primary light guide and the second secondary optic.

3 Claims, 5 Drawing Sheets

U.S. PATENT DOCUMENTS

| | | | | |
|---|---|---|---|---|
| 6,926,432 | B2 | 8/2005 | Rodriguez Barros et al. | |
| 6,953,274 | B2 | 10/2005 | Rice | |
| 7,011,438 | B2 * | 3/2006 | Schuster et al. | 362/507 |
| 7,070,310 | B2 * | 7/2006 | Pond et al. | 362/545 |
| 7,131,758 | B2 * | 11/2006 | Ishida | 362/545 |
| 7,156,544 | B2 * | 1/2007 | Ishida | 362/538 |
| 7,207,703 | B2 | 4/2007 | Iwasaki | |
| 7,258,474 | B2 * | 8/2007 | Valcamp et al. | 362/545 |
| 7,513,642 | B2 * | 4/2009 | Sormani | 362/245 |
| 2004/0042212 | A1 | 3/2004 | Du et al. | |
| 2004/0085779 | A1 | 5/2004 | Pond et al. | |
| 2005/0068787 | A1 | 3/2005 | Ishida | |
| 2006/0193145 | A1 | 8/2006 | Eichorn et al. | |
| 2009/0001490 | A1 | 1/2009 | Bogner et al. | |
| 2009/0073710 | A1 * | 3/2009 | Sormani et al. | 362/509 |

FOREIGN PATENT DOCUMENTS

| | | |
|---|---|---|
| DE | 10 2004 036 157 | 2/2006 |
| EP | 1 388 461 | 2/2004 |

* cited by examiner

LED HEADLAMP SYSTEM

CROSS-REFERENCE TO RELATED APPLICATION

The Applicants hereby claim the benefit of their Provisional Application Ser. No. 60/658,458 filed Mar. 4, 2005 for LED Headlamp System

TECHNICAL FIELD

The invention relates to electric lamps and particularly to vehicle headlamps. More particularly the invention is concerned with vehicle headlamps with LED light sources.

BACKGROUND ART

A vehicle headlamp system may be made from an LED light source, a primary lens and a secondary lens. A vehicle headlight beam has a hot spot that needs to illuminate the distant road center. Additionally, there is a spread beam that illuminates the right and left side of road, and perhaps upward for signage. The headlamp beam is commonly operated while drivers are approaching in the opposite direction. As a result all the beam features have to be operable so as not to blind the oncoming drivers. This blinding is unavoidable in the high beam mode, so there is necessarily a high and low beam mode. The high beam mode assumes there is no on coming driver. The low beam mode assumes there is an oncoming driver, so the hot spot must be centered low and or to the side of the road. Similarly, the spread beam cannot be excessively bright or wide. These features are commonly built into headlamps beams through skilled optical design stemming from high and low beam filaments or arc discharge positions, with the light being reflected from an optically defined reflector or refracted in a projector beam type system through a central lens. With the advent of LEDs there is interest in forming headlamp beams from LED sources. LED sources are generally not as intense, or do not have sufficient lumen out put to singly provide all the light that is necessary to form a headlamp beam. Accordingly, it would be an advance in the art to provide an LED headlight system for improved road visibility.

DISCLOSURE OF INVENTION

It is, therefore, an object of the invention to obviate the disadvantages of the prior art.

It is another object of the invention to enhance LED headlight systems.

These objects are accomplished, in one aspect of the invention by a vehicle headlamp comprising: a first planar array of LED light sources having a low beam subset of LEDs and a high beam subset of LEDs; a first primary optical light guide receiving low beam light from the low beam subset of first LED light sources and collimating said low beam light; a first secondary optical light guide receiving said collimated low beam light from the first primary light guide and focusing said light as a low beam hot spot; the first primary optical light guide receiving high beam light from the high beam subset of LEDs of the first LED array and collimating said high beam light; the first secondary optical light guide receiving said collimated high beam light from the first primary light guide and focusing said high beam light as a high beam hot spot in combination with the low beam hot spot; a second planar array of LED light sources having a low beam subset of LEDs and a high beam subset of LEDs; a second primary optical light guide receiving low beam light from the low beam subset of second LED light sources and collimating said low beam light; a second secondary optical light guide receiving said collimated low beam light from the second primary light guide and spreading said light as a low beam spread pattern; the second primary optical light guide receiving high beam light from the high beam subset of LEDs of the second LED array and collimating said high beam light; the second secondary optical light guide receiving said collimated high beam light from the second primary light guide and spreading said high beam light as a high beam spread pattern in combination with the low beam spread pattern; and a housing to mechanically support the first LED array, the second LED array, the first primary optic, the first secondary optic, the second primary light guide and the second secondary optic.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
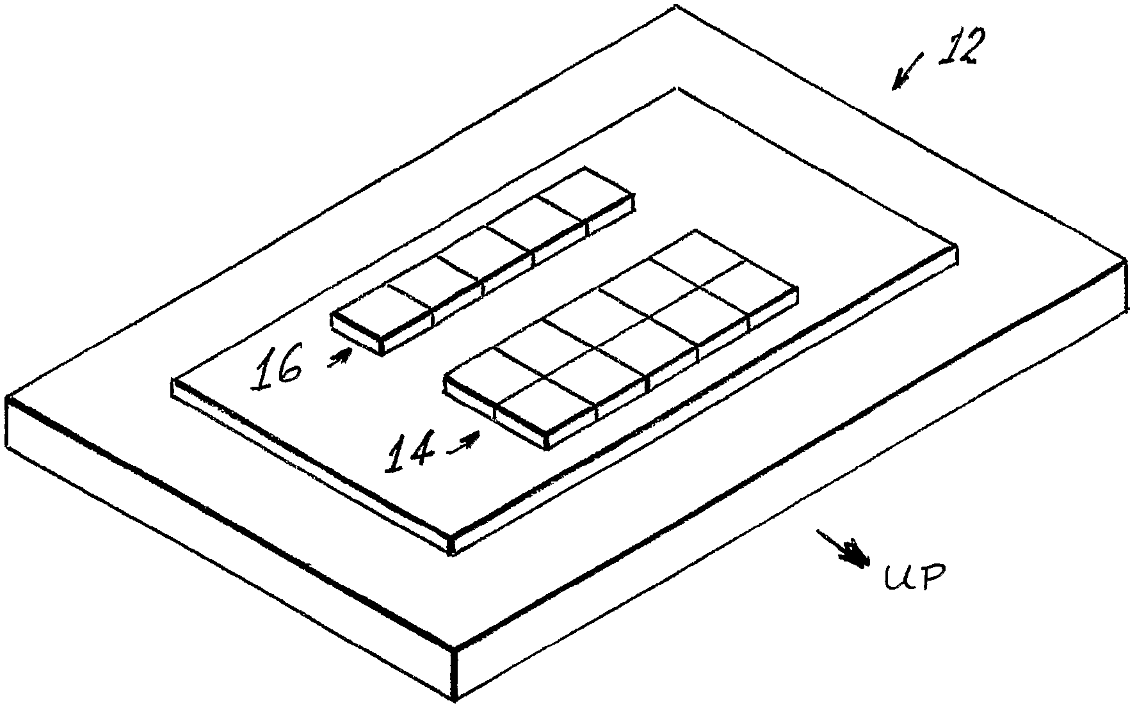
FIG. 1. is a perspective view of an LED array.
Figure 2:
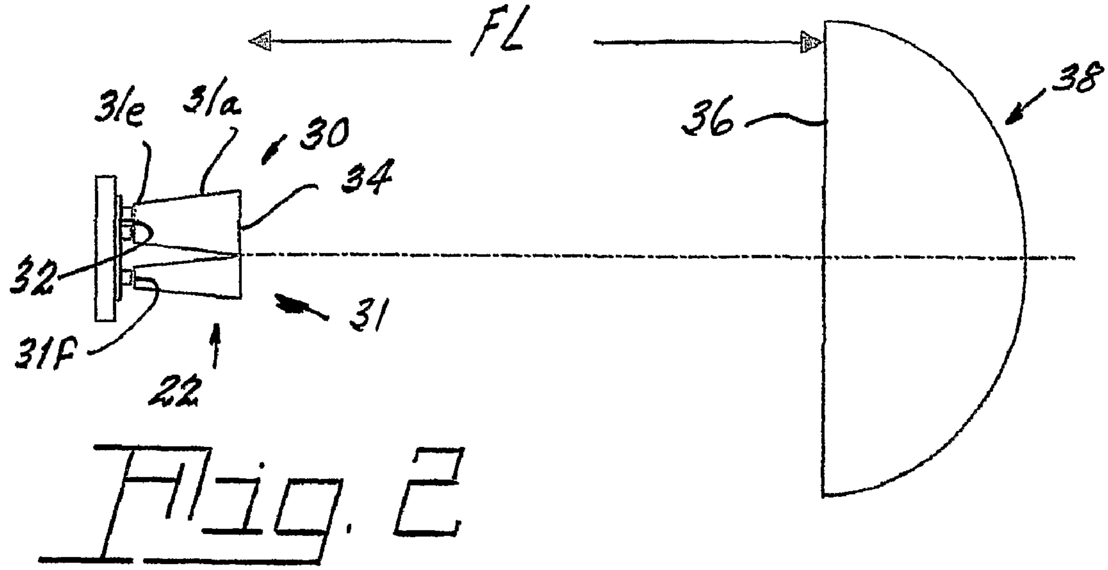
FIG. 2 shows a side, schematic view of the low and high beam, hot spot optics.
Figure 3:
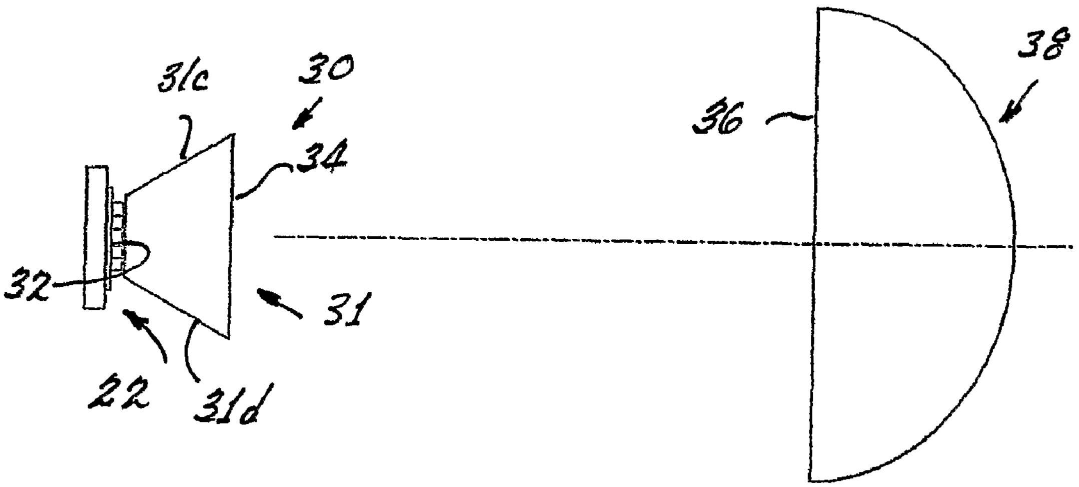
FIG. 3 shows a top, schematic view of the low and high beam hot spot optics.
Figure 4:
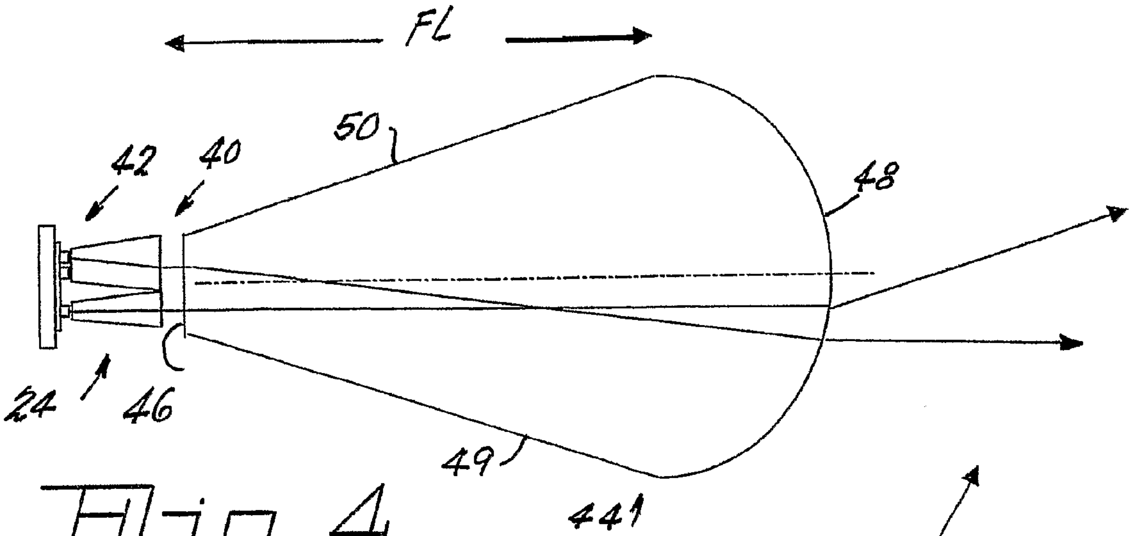
FIG. 4 shows a side, schematic view of the low and high beam, spread optics.
Figure 5:
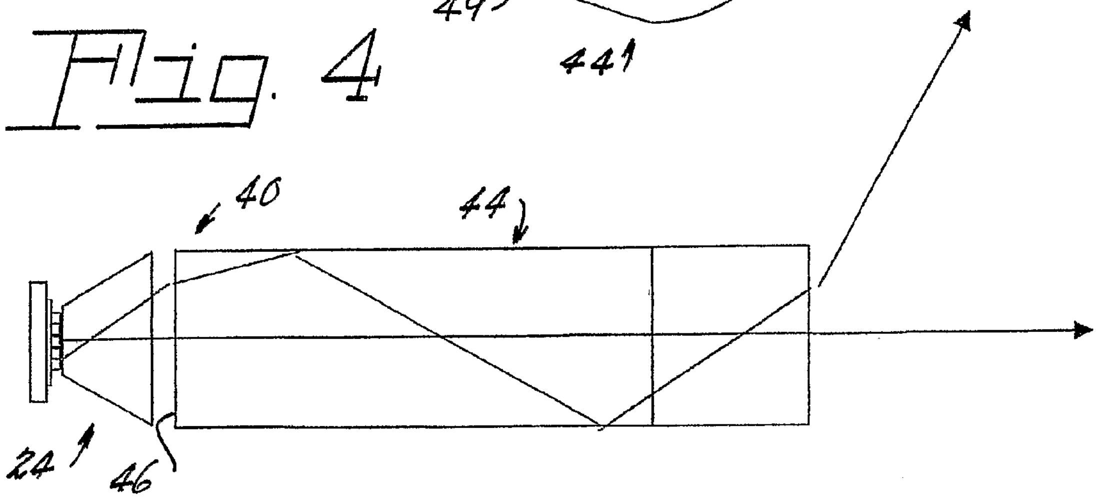
FIG. 5 shows a top, schematic view of the low and high beam spread optics.
Figure 6:
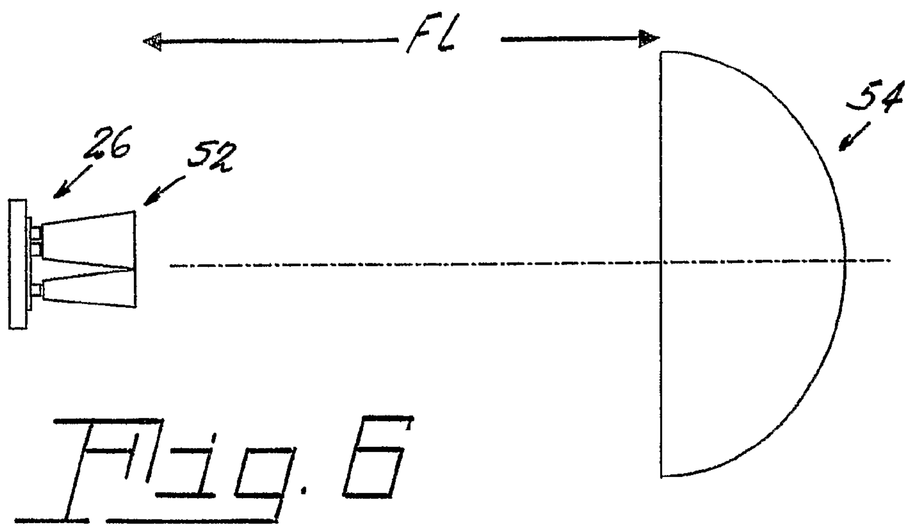
FIG. 6 shows a side, schematic view of the advanced low and high beam, hot spot optics.
Figure 7:
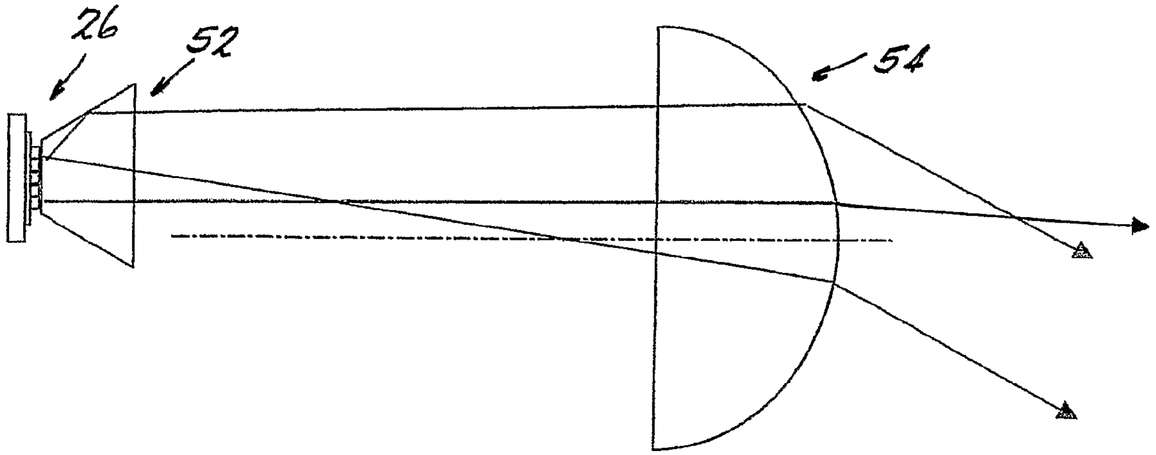
FIG. 7 shows a top, schematic view of the advanced low and high beam hot spot optics.
Figure 8:
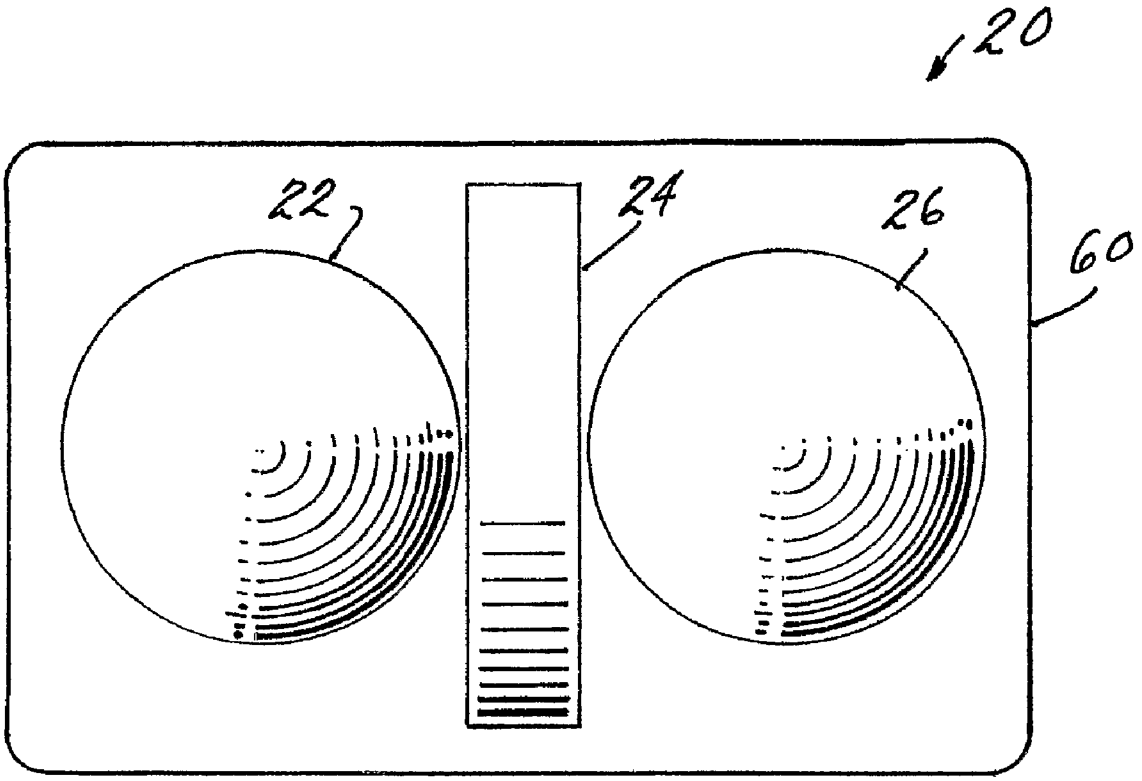
FIG. 8 shows a front schematic view of a headlamp.

FIG. 1 shows a front schematic view of an LED array 12 having a low beam subset 14 and a high beam subset 16. The LED headlamp system 20 (FIG. 8) is constructed from three arrays of LEDs, 22, 24, and 26. Each of the arrays may be similarly constructed, although a selective wiring of the LEDs will enable the different units to be dynamically illuminated for special lighting functions. The first array 22 is devoted to forming the low and high beam hot spots. The second array 24 is devoted to making the low and high beam spreads. The third array 26 is devoted to making additional beam features, such as hot spot or beam spread for advanced forward lighting systems. The preferred LEDs are 1 millimeter by 1 millimeter InGaN blue LED chips with phosphor coating on the chip top surface to achieve white color, each providing approximately 60 lumens of white light. The LEDs are 0.2 millimeters thick, and are operated at 700 milliamps at 3.5 volts. The ceramic support plates 13 are preferably made of aluminum nitride, 1 millimeter thick, with a thermal conductivity of 180 Watts per meter Kelvin. The LEDs are mounted to the ceramic with an epoxy with high thermal conductivity. The preferred epoxy is known as Arctic Silver and has a layer thickness of 0.1 millimeters and has a thermal conductivity of 10 watts per meter Kelvin.

The LED arrays are formed on ceramic plates 13 in planar array, for example, in a configuration that is three LEDs high and five LEDs wide. The ceramic mounting and electrical connection of the arrays is achieved by known LED construction methods. The LEDs face forward from the ceramic plate 13 generally in the direction of the field to be illuminated. In the preferred embodiment the LEDs are closely packed together for overall optical efficiency and material and space saving reasons. The rear side of the ceramic (not shown) may be coupled to a heat sink such as a metal plate with radiating metal fingers, ribs, fins or other heat dispersing features. In the preferred embodiment the LEDs are approximately X=1 millimeter square, and spaced apart one from the other by about Y=0.1 millimeter thereby forming a 3 by 5 array that is about (3X+2Y) by (5X+4Y) millimeter. The high beam row 16 is spread farther apart from the other two low beam rows 14 for optical reasons. In the preferred embodiment this was approximately 2 or 3 millimeter, which is added to the vertical height of the LED array.

The support ceramic plate 13 may be conveniently larger for heat sinking, mounting and other purposes. The LEDs may be mounted as chip-on-board or as LED modules. The LEDs are arranged in two circuits sets. The upper two rows 14 are designed for low beam operation, and the bottom row 16 is designed to be added additionally for high beam operation. The light emitted from the LEDs is generally directed forward towards the field to be illuminated with either the upper two rows 14 on for low beam operations or all three rows on for high beam operation.

The light emitted by the LEDs from the hot spot module 22 is captured by a first primary optic 30. The primary optic 30 is preferably a single piece optical light guide 31. It generally has the form of a trapezoidal polypiped. It has an elongated rectangular entrance window 32 that faces the LEDs for light input. The light guide extends in the forward direction to an elongated rectangular exit window 34. The entrance window 32 is smaller in area than the exit window 34. The light guide 31 has a flat top 31*a* and bottom 31*b* and right and left sidewalls 31*c*, 31*d*, each generally in the shape of a trapezoid. Simply stated, the smaller entrance window 32 is enclosed by planar sidewalls that lead to the slightly large sides of the exit window 34. As is shown, the light guide 31 may be formed with a first entrance window 31*e* shaped to span the low beam set of LEDs and a second entrance window 31*f* shaped and positioned to span the high beam set of LED. The first and second entrance windows are led to a common exit window 34 as before. While the primary optics for the low and high beam hot spot formation may be separately made and then mounted adjacent, it is preferred to make them as a single unit to avoid the need to optimally align two units with respect to each other. The primary light guide 31 may be a molded glass, plastic (polycarbonate or PMMI), or similarly appropriate substantially clear, light transmissive optical material, providing good internal reflection. Of these plastics, the PMMI is preferred because it does not yellow like other plastics. In one embodiment the entrance window 32 for the low beam primary light guide was 6 millimeter by 2.5 millimeter and for the high beam primary light guide 6 millimeter by 1.2 millimeter. The exit window 34 for both optics was 3 millimeter by 18 millimeter. The entrance window 32 was axially separated from the exit window 34 by 25 millimeter.

The first LED array 22 feeds a light guide 30 designed to generate the low and high beam hot spots. After passing though the primary optical light guide 30, the light issues from the exit window 34 as either a high or low beam oriented light source. The light is then received at the entrance 36 of a secondary light guide 38. The focal length, FL, is preferably 70 to 100 mm. The secondary light guide 38 is a hemispherical or aspheric lens with the flat diametric side facing the exit window of the primary optic. The secondary light guide focuses the light from the primary light guide 30 on the hot spot target. The light from the first array's low beam LEDs thus passes through the primary light guide 30 to the secondary light guide 38 to be focused at the low beam hot spot. The light from the first array's high beam LEDs passes through the primary light guide 30 to the secondary light guide 38 to be additively focused to form the high beam hot spot. In one embodiment the secondary light guide 38 was a hemisphere with a diameter of 100 millimeter.

The second LED array 24 feeds a second optical system 40 to generate the low and high beam spread patterns. The second optical system 40 has a second primary light guide 42 designed to generate the low and high beam spread patterns. In the preferred embodiment and for overall cost, the second primary light guide 42 is preferred to be the same as the first primary optic. The second primary light guide 42 then feeds collimated light to a second secondary light guide 44. Again, the focal length, FL, is preferably 70 to 100 mm. The second secondary light guide 44 has a horizontally elongated rectangular entrance window 46 and an exit window 48 that is vertically curved, for example a horizontally oriented cylindrical section. The entrance window 46 is smaller than the exit window 48, and there are flat planar sides 49, 50 leading from the entrance window 46 to the exit window 48. The preferred second secondary light guide 44 has the same entrance window as the first secondary light guide. Light is then received from the second LED array into the entrance window of the second primary optic. This light is directed to the entrance 46 of the second secondary light guide and passed out the exit window 48 of the second secondary light guide 44 directly to the field to be illuminated. The exiting light is vertically focused to be in the horizontal plane, but is not focused side to side. The issuing light is then centered on the hot spot but spreads horizontally side-to-side from the hot spot thereby forming the spread pattern. Again, the addition of the light out put from the subset of high beam LEDs is added to the light form the subset of low beam LEDs thereby enhancing the low beam spread pattern to achieve the high beam spread pattern.

In one embodiment, the second secondary light guide had an entrance window 46 that was 8 millimeter by 20 millimeter. The exit window 48 was section of an arc with a radius of 60 millimeter, over an angle of 120 degrees. This pie slice was 20 millimeter thick in the horizontal direction.

The light from the third LED array 26 is received by a third primary light guide 52 and passed to a secondary light guide 54 in substantially the same fashion as is the light from the first LED array. The light from the third LED array 26 is supplied to the beam as the vehicle is turned, horizontally toward the side of the vehicle with the third LED array. This additional light then extends the beam pattern to the side of the vehicle to illuminate the road being turned to. The third LED array 26 is electrically controlled so that the number of horizontally arrayed LEDs is turned on according to the degree of turning and the speed of travel. In this way the low beam hot spot is extended to a side of the beam pattern as the vehicle turns in that direction. The light from the third LED array 26 then fills in the relatively less illuminated regions where the vehicle is turning to. Similarly the high beam hot spot is correspondingly extended in vehicle turns. The opposite side of the vehicle is equipped with a similar headlamp, however the third LED array 26 on the opposite side is positioned oppositely and electrically wired to fill in similarly the high and low beam patterns for turns in the opposite direction.

The ten low beam LEDs of the first LED array 22 provide approximately 600 lumens for the low beam hot spot. The five additional LEDs provide approximately 300 lumens for the high beam hot spot.

The ten low beam LEDs of the second LED array 24 provide approximately 600 lumens for the low beam spread pattern. The five additional LEDs provide approximately 300 lumens for the high beam spread pattern.

The ten low beam LEDs of the third LED array 26 provide approximately 600 lumens for the advanced forward lighting system (AFS) low beam hot spot. The five additional LEDs provide approximately 300 lumens for the AFS high beam hot spot.

The arrays are conveniently mounted in a suitable reflector or similar housing 60.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A vehicle headlamp comprising:

a first planar array of LED light sources having a low beam subset of LEDs and a high beam subset of LEDs;

a first primary optical light guide receiving low beam light from the low beam subset of first LED light sources and collimating said low beam light;

a first secondary optical light guide receiving said collimated low beam light from the first primary light guide and focusing said light as a low beam hot spot;

the first primary optical light guide receiving high beam light from the high beam subset of LEDs of the first LED array and collimating said high beam light;

the first secondary optical light guide receiving said collimated high beam light from the first primary light guide and focusing said high beam light as a high beam hot spot in combination with the low beam hot spot;

a second planar array of LED light sources having a low beam subset of LEDs and a high beam subset of LEDs;

a second primary optical light guide receiving low beam light from the low beam subset of second LED light sources and collimating said low beam light;

a second secondary optical light guide receiving said collimated low beam light from the second primary light guide and spreading said light as a low beam spread pattern;

the second primary optical light guide receiving high beam light from the high beam subset of LEDs of the second LED array and collimating said high beam light;

the second secondary optical light guide receiving said collimated high beam light from the second primary light guide and spreading said high beam light as a high beam spread pattern in combination with the low beam spread pattern; and a housing to mechanically support the first LED array, the second LED array, the first primary optic, the first secondary optic, the second primary light guide and the second secondary optic.

2. The headlamp system in claim 1, further including a third LED array, providing high and low AFS hot spot light to a third primary light guide, that in turn feeds collimated AFS hot spot light to a third secondary light guide directing the AFS hot spot light to fill a region horizontally to a side of the low beam hot spot in the low beam mode and to a side of the low beam hot spot and the high beam hot spot when in the high beam mode.

3. The headlamp system in claim 1, wherein horizontal subsets of the LEDs of the third LED array are electrically coupled for selective operation according to control signals.

* * * * *